(12) United States Patent
Valdez

(10) Patent No.: US 6,257,266 B1
(45) Date of Patent: Jul. 10, 2001

(54) METHOD AND APPARATUS FOR IN-LINE REPAIR OF PIPELINES

(76) Inventor: Samuel A Valdez, 10179 Rd. 6E, Alamosa, CO (US) 81101

( * ) Notice: Subject to any disclaimer, the term of this patent is extended or adjusted under 35 U.S.C. 154(b) by 0 days.

(21) Appl. No.: 09/531,386

(22) Filed: Mar. 21, 2000

(51) Int. Cl.$^7$ .......................... F16K 43/00; F16K 55/18; F16K 55/128
(52) U.S. Cl. ................................. 137/15.08; 137/15.09; 137/15.15; 137/315.01; 137/318; 138/89; 138/97
(58) Field of Search .................. 137/15.08, 15.14, 137/15.15, 315.01, 318, 15.09, 317; 138/89, 94, 94.3, 97, 93

(56) References Cited

U.S. PATENT DOCUMENTS

| | | | |
|---|---|---|---|
| 2,736,335 | * | 2/1956 | Webber ................................. 137/318 |
| 2,763,282 | * | 9/1956 | Reedy et al. ......................... 137/318 |
| 2,899,983 | * | 8/1959 | Farris ................................... 137/318 |
| 2,964,290 | * | 12/1960 | Mueller ................................ 137/318 |
| 3,104,456 | * | 9/1963 | Powell ................................. 137/318 |
| 3,315,986 | * | 4/1967 | Quick ................................... 138/97 |
| 3,516,426 | * | 6/1970 | Toll ...................................... 137/318 |
| 3,845,789 | * | 11/1974 | Rohrer .................................. 138/97 |
| 3,976,091 | * | 8/1976 | Hutton ................................. 137/318 |
| 4,235,259 | * | 11/1980 | Hudock ................................ 138/97 |
| 4,239,055 | * | 12/1980 | Coffman .............................. 137/315 |
| 4,357,960 | * | 11/1982 | Han ...................................... 138/97 |
| 4,529,007 | * | 7/1985 | Goforth ................................ 138/89 |
| 5,152,311 | * | 10/1992 | McCreary ............................ 137/89 |
| 5,433,251 | * | 7/1995 | Elgar et al. ........................... 138/98 |
| 5,577,528 | * | 11/1996 | Saha et al. ........................... 137/318 |
| 5,967,191 | * | 10/1999 | Mummolo ............................ 138/97 |

\* cited by examiner

*Primary Examiner*—George L. Walton
(74) *Attorney, Agent, or Firm*—John E. Reilly

(57) ABSTRACT

A method and apparatus for the in situ repair or replacement of a pipeline, such as, a natural gas pipeline is made up of a transition fitting having a tubular section with means for temporarily sealing off that section, an expansion tool having an elongated handle control and an expandable portion insertable through the transition fitting and into an upstream pipeline to form a seal which prevents the escape of gas from the pipeline while one end of the transition fitting is being joined to the upstream pipeline. After the expandable portion is removed from the pipeline and the transition fitting, the tubular section of the transition fitting is sealed to prevent the escape of gas into the atmosphere as the fitting is being joined with the downstream or replacement pipeline. Once joined, the seal on the transition fitting is removed and the gas in the pipeline is free to flow through the pipeline. The transition fitting thereby allows the existing upstream pipeline to be joined to the existing downstream pipeline or to be joined to a new pipeline.

11 Claims, 3 Drawing Sheets

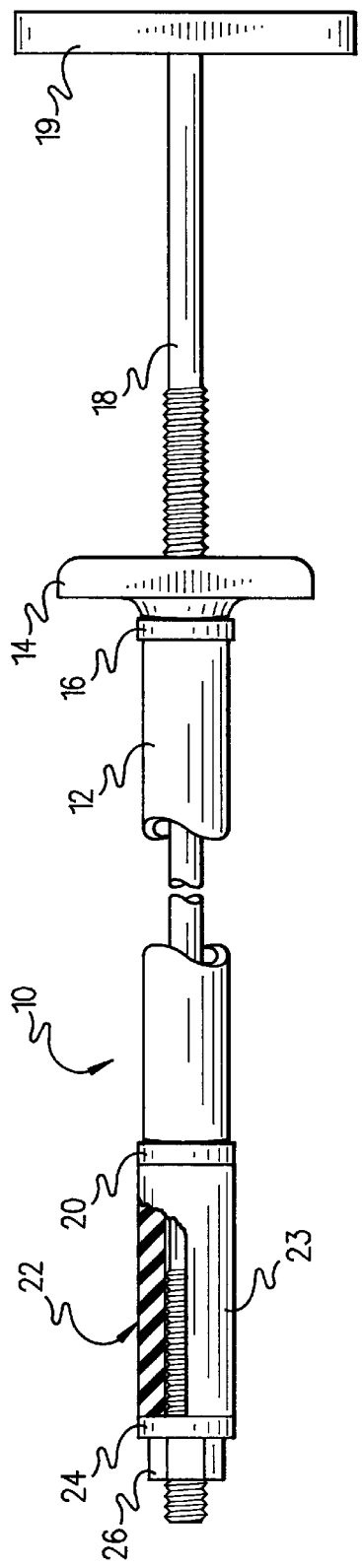
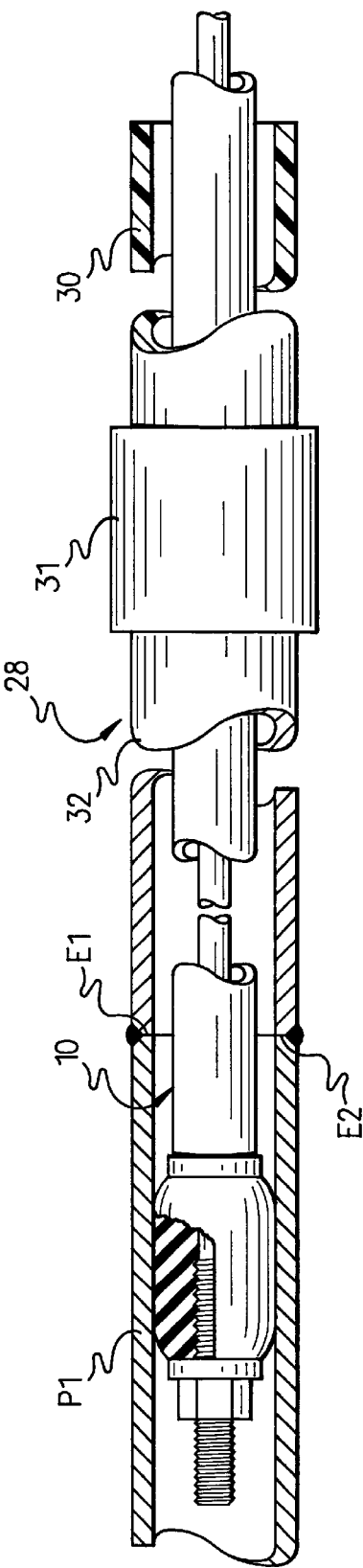

METHOD AND APPARATUS FOR IN-LINE REPAIR OF PIPELINES

BACKGROUND AND FIELD OF INVENTION

This invention relates to a method and apparatus for the in-line repair or replacement of pipelines, and more particularly to a novel and improved method and apparatus for the in situ repair or replacement of natural gas pipelines.

Numerous methods have been devised for the repair or replacement of gas pipelines. One method requires a trench to be excavated from a stop valve located upstream from the section of pipeline to be replaced. Manipulating the valve then stops the gas flow and the pipeline section is replaced. This method was improved by the development of devices that temporarily block the flow of gas in a pipeline. This method did not require the excavation of a stop valve but functioned by inserting into the pipeline a device that could be expanded and thereby block the flow of gas in a pipeline. Both of these methods were very time-consuming and labor-intensive. Another method allows the gas to escape to the atmosphere while the pipeline is replaced. However because of the long term and continuous exposure to gas, this method required the use of special equipment such as fire resistant clothing and respirators for the workers. Additionally, the released gas constitutes a safety hazard.

Devices for temporarily stopping the flow of gas in a pipeline are shown in U.S. Pat. Nos. 5,590,676 and 4,127,141. The '676 patent discloses a stopper for an opening in a gas pipeline side wall having an expansion plug that can be axially compressed, thereby expanding the plug to fill and seal the pipe. The '141 patent teaches a method and apparatus for sealing an opening in the side wall of a pipeline that includes a plug wrench having an elongated stem and a stopper rod that can be moved relative to a threaded jack member to cause a resilient plug to radially expand.

Tools for temporarily stopping the flow of gas in a pipeline are shown in U.S. Pat. Nos. 5,592,965; 4,597,147 and 5,819,804. The '965 patent discloses a valve stop changer including a tool having a tubular expandable plug member which is compressed and expanded by rotating a handle to move into sealed engagement with a pipe. The '147 patent discloses a changer tool for use in removing a valve under pressure. The tool is a shaft supporting a compressible rubber plug that is inserted through the valve into the upstream pipe. The plug is then compressed into sealed engagement with the inner wall of the pipe. The '804 patent is directed to a specific improvement in an expansion tool for a pipeline.

SUMMARY OF THE INVENTION

It is therefore an object of the present invention to provide a novel method and apparatus for repairing or replacing a pipeline that doesn't require sidewall insertion seal off devices. Another object of the present invention is to provide a novel method and apparatus to seal off the pipeline using an axially insertable device in a rapid, efficient manner. It is a still further object of the present invention to provide a novel method and apparatus for quickly and efficiently repairing the old pipeline and at the same time replace the old pipeline with a new pipeline and facilitates replacement of metal pipeline sections with new plastic lines in a minimum number of steps.

The present invention is directed to a method and apparatus to temporarily seal off a pipeline thorough the combined use of a transition fitting and an axially insertable expandable tool. The transitional fitting can be any tubular device with some means to temporarily seal the pipeline off after completing the first step of joining the transition fitting to the upstream line, following which the other end of the transition fitting can be joined to a new or replacement pipeline. The transition fitting can be one continuous metal pipe if it is to be joined to an existing metal downstream pipeline or can be a combination metal and plastic tubular section if it is to join a metal pipeline and plastic pipeline.

In the preferred form, the transition fitting has a tubular metal and plastic portion. The plastic portion is resilient so that it can be compressed for temporarily sealing off the transition fitting. An expansion tool, having an elongated handle control and an expandable portion is then inserted through the transition fitting and into the upstream pipeline. The expandable portion is expanded by the handle control to form a seal with the inner surface of the upstream pipeline to prevent the escape of gas from the pipeline while the metal end of the transition fitting is being joined to the metal pipeline. The expandable portion is then contracted thereby breaking the seal with the pipeline and is removed from the pipeline and the transition fitting. The plastic portion of the transition fitting is then compressed to prevent the escape of gas into the atmosphere as the plastic end of the transition fitting is being joined to the downstream plastic pipeline. Once joined, the compression is removed to permit the plastic pipe portion to return to its original shape and the gas in the pipeline is free to flow through the new replacement pipeline.

There has thus been outlined, rather broadly, the more important features of the invention in order that the detailed description that follows may be better understood. There are additional features of the invention that will be described which will form the subject matter of the claims appended. It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed are for the purpose of description and should not be regarded as limiting. As such those skilled in the art will appreciate that the conception, upon which this disclosure is based, may readily be utilized as a basis for the designing of other structures, methods, and systems for carrying out the several purposes of the present invention. It is important therefore, that the claims be regarded as including such equivalent constructions insofar as they do not depart from the spirit and scope of the present invention.

The above and other objects, advantages and features of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1 is a front view partially in section of a preferred form of expansion tool;

FIG. 2 is an exploded view partially in section of the expansion tool positioned inside a pipeline;

DETAILED DESCRIPTION OF PREFERRED EMBODIMENT

Figure 3:
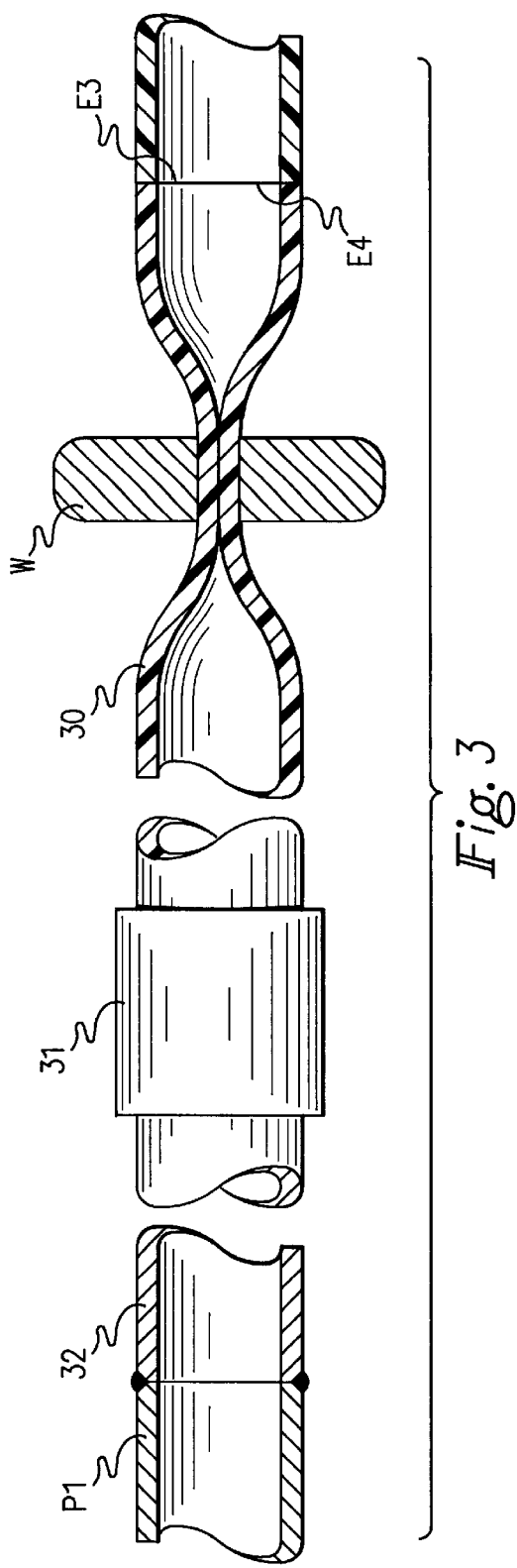
FIG. 3 is an exploded view of a transition fitting.

Referring to the drawings in more detail, there is illustrated in FIGS. 1 to 5 a preferred form of pipeline repair apparatus for repairing in situ a natural gas metal pipeline P1 and connecting to a new metal or plastic pipeline P2 while sealing off the lines from the escape of gas during the repair. As a setting for the present invention, the preferred form will be described in joining the existing metal pipeline P1 to a plastic pipeline in order to meet the code requirements in most areas of the U.S. Nevertheless, it will be readily understood that the invention is conformable for use in connecting metal-to-metal lines together.

As shown in FIG. 1, the preferred form of apparatus is broadly comprised of an expansion tool 10 which is axially insertable through a transition fitting 28 into an inner surface of the pipeline P1 just upstream of an end portion E1 where the repair or replacement has to be made. Thus, the pipeline P1 is illustrated after the section of the line to be repaired has actually been removed thereby leaving the end E1. The tool 10 is made up of a rigid metal tubing 12, a control handle consisting of a elongated threaded rod 18 extending through the tubing 12 and a handgrip 19 at one end and expandable portion 22 at the opposite or distal end of the rod 18. The expandable portion 22 includes a resilient sleeve 23 in surrounding relation to the rod 18 having a flat washer 24 bearing against one end and backed up by a locking nut 26, and a flat washer 20 between the opposite end of the sleeve 23 and the tube 12. Another flat washer 16 is disposed on the rod 18 at the opposite end of the tube 12 and backed up by a wing nut 14. Preferably the sleeve 23 is composed of a rubber or rubber-like material which will undergo radial expansion into sealed engagement with the inner surface of the line P1, as shown in FIG. 2, when the wing nut 14 is rotated and threadedly advanced along the rod 18 to force the tube 12 forwardly against the washer 20 to squeeze the sleeve against the stationary washer 24 and its associated locking nut 26. Of course, when the nut 14 is rotated in the reverse direction to relax the pressure on the sleeve 23, the resilience of the sleeve 23 is such that it will automatically contract into its original position as shown in FIG. 1.

Figure 4:
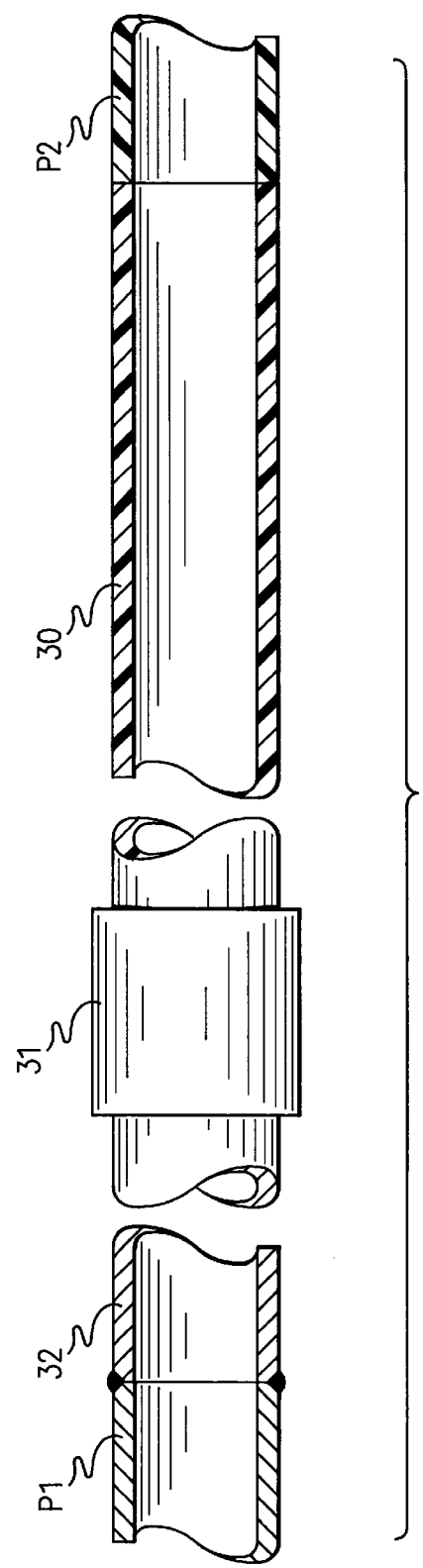
FIG. 4 is an exploded view of the pipeline after the repair or replacement is finished.
Figure 5:
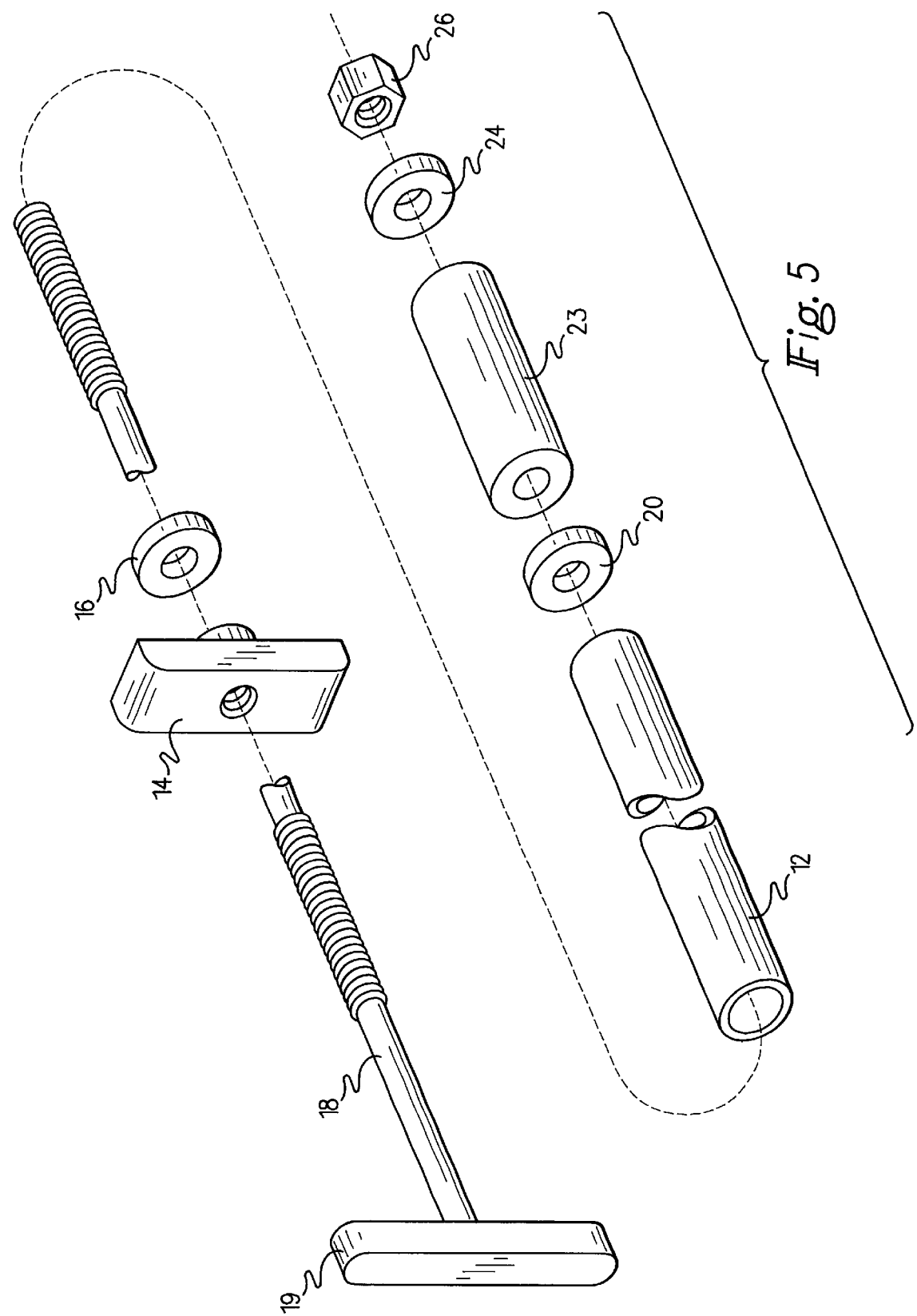
FIG. 5 is an exploded view of the expansion tool.

The preferred form of the transition fitting 28, as shown in FIGS. 2 to 4, is comprised of a first metal pipe portion 32 and a second resilient plastic pipe portion 30 permanently attached in end to end relation to one another by a coupling member 31. In this way, the end E2 of the first metal portion 32 can be joined by welding to the end E1 of the line P1, as shown in FIGS. 2 to 4, when the line P1 is sealed off by the expansion tool 10. In turn, the second plastic pipe portion 30 preferably has its end E3 joined to end E4 of the replacement line P2 by fusing together into abutting relation as shown in FIGS. 3 and 4. Preferably, the natural gas is sealed off upstream of the joint by compressing the resilient pipe portion 30 into a fully collapsed or closed position, such as, a wrench W or other suitable clamping device as shown in FIG. 3. In this way, the gas is temporarily sealed off above the joint and, when the compression is released, the second plastic pipe portion 30 will return to its original state or configuration.

It will be evident that other means for temporarily sealing off the transition fitting 28 may be employed, for example, if the fitting is modified to be made up of a single metal pipe section to join the line P1 to another metal line, not shown. Here, reference is made to various sidewall type sealing devices hereinbefore described in the Background and Field of Invention.

In actual practice, a section of pipe is identified to be repaired or replaced. That section is then removed leaving an upstream P1 and a downstream pipeline P2. The first metal pipe portion of the transition fitting 28 is abutted to the upstream pipeline 36 and then the expansion tool 10 is axially inserted through the transition fitting 28 and into the upstream pipeline P1. The expansion tool is then manipulated to expand the expandable portion 22 to form a tight seal with the inner surface of the upstream pipeline. The preferred embodiment uses the rubber sleeve 23 as the expandable portion 22, however other materials that can form a temporary seal with the inner surface of the upstream pipeline can be used. Once the expandable portion 22 is in sealed engagement with the inner surface of the upstream pipeline, the first metal pipe portion of the transition fitting 28 is joined to the upstream pipeline 36. For best results the first metal pipe portion of the transition fitting 28 is metal and is welded to the upstream pipeline P1, however the first metal pipe portion 32 can be made from any material that will allow joining, such as welding, mechanical coupling or gluing, to the existing pipeline. The tool 10 is now removed by reverse rotating the rod 18 with respect to the nut 26, to contract the expandable portion 22 and thereby allow easy removal of the expansion tool 10 from the upstream pipeline P1 and transition fitting 28. For the purpose of illustration but not limitation, the expansion tool 22, as depicted in the figures, is about 9/16 inch in diameter and is used with ½ or ¾ diameter pipelines. It is anticipated that a larger expansion tool can be constructed for larger diameter pipelines using the principles outlined above, however, for larger diameter expansion tools, the gas pressure in the pipeline typically is less than 45 psi.

The second plastic pipe portion of the transition fitting 30 is now temporarily sealed to prevent the escape of gas into the atmosphere while the second plastic pipe portion 30 is joined to either a new pipeline or the existing pipeline. The second plastic pipe portion 30 of the transition fitting may be made from any material that can be temporarily sealed off to allow for safe joining to the existing or new downstream pipeline. The preferred embodiment envisions that the second portion of the transition fitting will be made from any resilient material that can spring back into its original shape , such as, polyethylene.

It will now be understood that what has been disclosed herein includes a new method and apparatus for repairing or replacing pipelines, and more particularly to a novel and improved method and tool system for in-line repair or inline replacement of natural gas pipelines. Those having skill in the art to which the present invention relates will now, as a result of the teaching herein, perceive various modifications and additions which may be made to the invention, such as alternative shapes. Accordingly, all such modifications and additions are deemed to be within the scope of the invention which is to be limited only by the claims.

I claim:

1. Apparatus for joining a metal pipeline to a plastic pipeline, said apparatus comprising:

a transition fitting having a first metal pipe portion and a second plastic pipe portion, said first metal portion being disposed in end-to-end relationship to said second plastic pipe portion and said first metal portion being adapted to be joined to said metal pipeline, an expansion tool having a radially expandable portion insertable through said transition fitting and into said metal pipeline including means to expand said expandable portion of said expansion tool into sealed engagement with an inner surface of said metal pipeline to prevent the escape of gas through said metal pipeline when said metal portion is being joined thereto;

means to contract said expandable portion of said expansion tool to remove said tool from said metal pipeline and said transition fitting; and means to temporarily seal off said second plastic pipe portion of said transition fitting to prevent the escape of gas through said fitting when said second plastic pipe portion of said transition fitting is being joined to said plastic pipeline.

2. The apparatus of claim 1, wherein said expandable portion is a rubber sleeve.

3. The apparatus of claim 1, wherein said second portion of said transition fitting is made of resilient plastic.

4. The apparatus of claim 1, wherein said first portion of transition fitting is made of metal.

5. Apparatus for joining an existing metal pipeline to a new plastic pipeline, said apparatus comprising:

a transition fitting having a metal pipe portion and a plastic pipe portion, said metal portion being attached to and in end-to-end relation to said plastic portion and said metal portion being adapted to be joined to said existing metal pipeline;

an expansion tool having an expandable sleeve portion insertable through said transition fitting and into said existing pipeline and control means including an elongated threaded rod and nut to expand said expandable portion of said expansion tool into sealed engagement with an inner surface of said existing pipeline to prevent the escape of gas through said metal pipeline when said metal portion is being joined thereto;

said control means being further operative to contract said expandable portion of said expansion tool to remove said tool from said existing pipeline and said transition fitting after said metal portion is joined to said metal pipeline; and means to temporarily seal off said plastic portion of said transition fitting to prevent the escape of gas through said existing pipeline when said plastic portion of said transition fitting is being joined to said new plastic pipeline.

6. The apparatus of claim 5, wherein said plastic portion is made of resilient plastic.

7. The apparatus of claim 5, wherein said metal portion is permanently attached to said plastic portion.

8. The apparatus of claim 5, wherein said metal portion is permanently attached to said plastic portion.

9. A method for connecting an existing metal pipeline or section to a new plastic pipeline in situ, comprising the steps of:

identifying a section of said metal pipeline to be connected;

providing a transition fitting having a first metal pipe portion and a second plastic pipe portion;

positioning an end of said first portion of said transition fitting adjacent to an end of said metal pipeline;

providing an expansion tool having an expandable portion being insertable through said transition fitting and into said metal pipeline such that said expandable portion of said expansion tool is located within said upstream pipeline;

expanding said expandable portion of said expansion tool into sealed engagement with an inner surface of said metal pipeline to prevent the escape of gas through said metal pipeline;

joining said metal pipeline to said end of the metal portion of said transition fitting;

contracting said expandable portion and removing said expansion tool from said transition fitting and said upstream pipeline;

compressing said plastic portion of said transition fitting to prevent fluid flow therethrough;

joining said plastic portion of said transition fitting to said plastic pipeline; and decompressing said plastic portion of said transition fitting.

10. The method of claim 9, wherein said plastic portion of said transition fitting is heat fused to said plastic pipeline.

11. The method of claim 9, wherein said metal portion of said transition fitting is welded to said metal pipeline.

* * * * *